United States Patent [19]
Warren

[11] 3,708,247
[45] Jan. 2, 1973

[54] FLUID STEPPING MOTOR
[75] Inventor: Raymond W. Warren, McLean, Va.
[73] Assignee: The United States of America as represented by the Secretary of the Army
[22] Filed: Feb. 26, 1971
[21] Appl. No.: 119,241

[52] U.S. Cl. ................................. 415/51, 137/81.5
[51] Int. Cl. .............................................. F01b 25/00
[58] Field of Search ........................ 415/51; 137/81.5

[56] References Cited
UNITED STATES PATENTS 3,282,562  11/1966  Bauer ..................................... 415/51
3,581,757  6/1971   Paulin et al .......................... 137/81.5

*Primary Examiner*—C. J. Husar
*Attorney*—Harry M. Saragovitz, Edward J. Kelly, Herbert Berl and Saul Elbaum

[57] ABSTRACT

A fluid stepping motor for providing a rotary mechanical output for a fluidic digital logic system. A rotor having a plurality of blades radially disposed about a pivotable shaft is driven in a stepping fashion by fluid impulses issuing from the output channels of a bistable fluid amplifier. A pair of fluid streams issuing from the output channels of a second bistable fluid amplifier each act in conjunction with one of the aforesaid drive channels to bring the rotor to a position of stable equilibrium prior to the application of the next step command. The equilibrium position established for the rotor by the action of one drive channel and one hold channel will bring another blade of the rotor into the proper position for receiving the next command from the other drive channel when the corresponding amplifiers are switched. Each time a pulse is applied to the input of the system, the rotor will advance one step and provide an output indication at the central shaft. The input to the system may be provided by any conventional pulsed device such as a fluid pulse converter.

7 Claims, 3 Drawing Figures

INVENTOR,
RAYMOND W. WARREN

FLUID STEPPING MOTOR

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to stepping devices and more particularly to a fluid stepping motor which provides a rotary mechanical output for a fluidic digital logic system.

2. Description of the Prior Art

A stepping motor in general is defined as one whose output shaft rotates through a fixed angle in response to an input pulse. The main advantage of a stepping motor is that it is able to operate in a open-loop servosystem. Since there is no check on the load position in such a system, the system accuracy is solely a function of the motor's ability to step through the exact number of steps commanded at the input. The vast majority of stepping motors utilized in industry today are of the electromechanical type, i.e. those that translate an electrical pulse input into a mechanical angular output at a rate determined by the input pulse frequency. See, for example, Understanding Digital Stepping Motors, Electronic Products Magazine, August 1970, pp. 99-105. As a link between electronic and mechanical elements, stepping motors have long been used in machine tool control and in military equipment. Recent trends are, however, leading to much wider use in data logging and other instrumentation activities, and in computer peripherals. The rising demand for high-speed, high-power stepping motors has led to the recent development of electro-hydraulic stepping motors which characteristically employ an electric stepping motor to position a hydraulic control valve, which in turn controls a hydraulic motor. Typical of such applications is a numerical control system that utilizes a digital computer as a central processor to manipulate a machine tool wherein the speed with the machine tool slide is positioned determines the work output of the tool.

Pure fluid control systems have recently gained wide popularity in industrial production and digital logic systems, due primarily to their low cost, ease of manufacture, absence of moving parts, and high reliability. Corresponding to the increase in acceptance of pure fluid control systems has been a demand for a reliable, low-cost fluid stepping motor that will serve much the same purpose in a fluid control system as the aforedescribed electric stepping motors served in the corresponding electro-mechanical and electro-hydraulic control systems. That is, the advent of the fluidic art emphasizes the need for a fluidic device that transforms a fluid pulse input into a rotary mechanical output for use in fluidic digital logic and control systems.

It is therefore a primary object of the present invention to provide a fluid stepping motor that transforms a fluid pulse input into a rotary mechanical output.

Another object is to provide a fluid stepping motor that has high reliability, low cost, and is amenable to fluidic digital logic and control systems.

A further object of the present invention is to provide a highly reliable fluid stepping motor that transduces each fluid pulse at its input into an angular mechanical output at a rate that is directly proportional to the frequency of the fluid input pulses.

An additional object of the present invention is to provide a stepping motor that transforms a fluid pulse input into a rotary mechanical output that contains a minimum of moving parts, is highly rugged, and is not subject to deterioration or wear.

SUMMARY OF THE INVENTION

Briefly, in accordance with the invention, a fluid stepping motor is provided that comprises a pair of bistable fluid amplifiers, fluid means for controlling the issuance of fluid from said amplifiers, and a rotary mechanical output device that accepts fluid impulses from the output channels of the two amplifiers in such a manner so as to give a mechanical stepping output indication upon the application of each fluid pulse to the control means. The rotary mechanical output device typically comprises a rotor having a plurality of blades radially connected to a pivotable shaft wherein any motion imparted to the blades will be transmitted to the shaft to provide an angular output indication. The two output channels from one of the bistable fluid amplifiers are both utilized as drive channels and are positioned among the blades of the rotor so that the fluid issuing therefrom impinges upon one of said blades during each alternating drive cycle so as to advance the rotor two steps during each complete switching cycle. The two output channels from the other bistable fluid amplifier are utilized as hold channels to maintain the rotor in the proper position prior to the receipt of the next pulse input. One drive channel and one hold channel work in conjunction and are "ON" simultaneously such that after the fluid issuing from the drive channel has impinged upon a particular blade of the rotor so as to advance it a certain number of degrees, the fluid issuing simultaneously from the corresponding hold channel impinges upon the same blade on its reverse side so as to bring the blade and thus the rotor to a position of stable equilibrium. This position of stable equilibrium with respect to the first set of drive and hold channels will bring another blade of the rotor in a position relative to the other drive channel ready to receive the next pulsed command. This will occur upon the switching of the two bistable amplifiers by the control means which typically comprises another fluid amplifier in conjunction with a fluid pulse converter.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
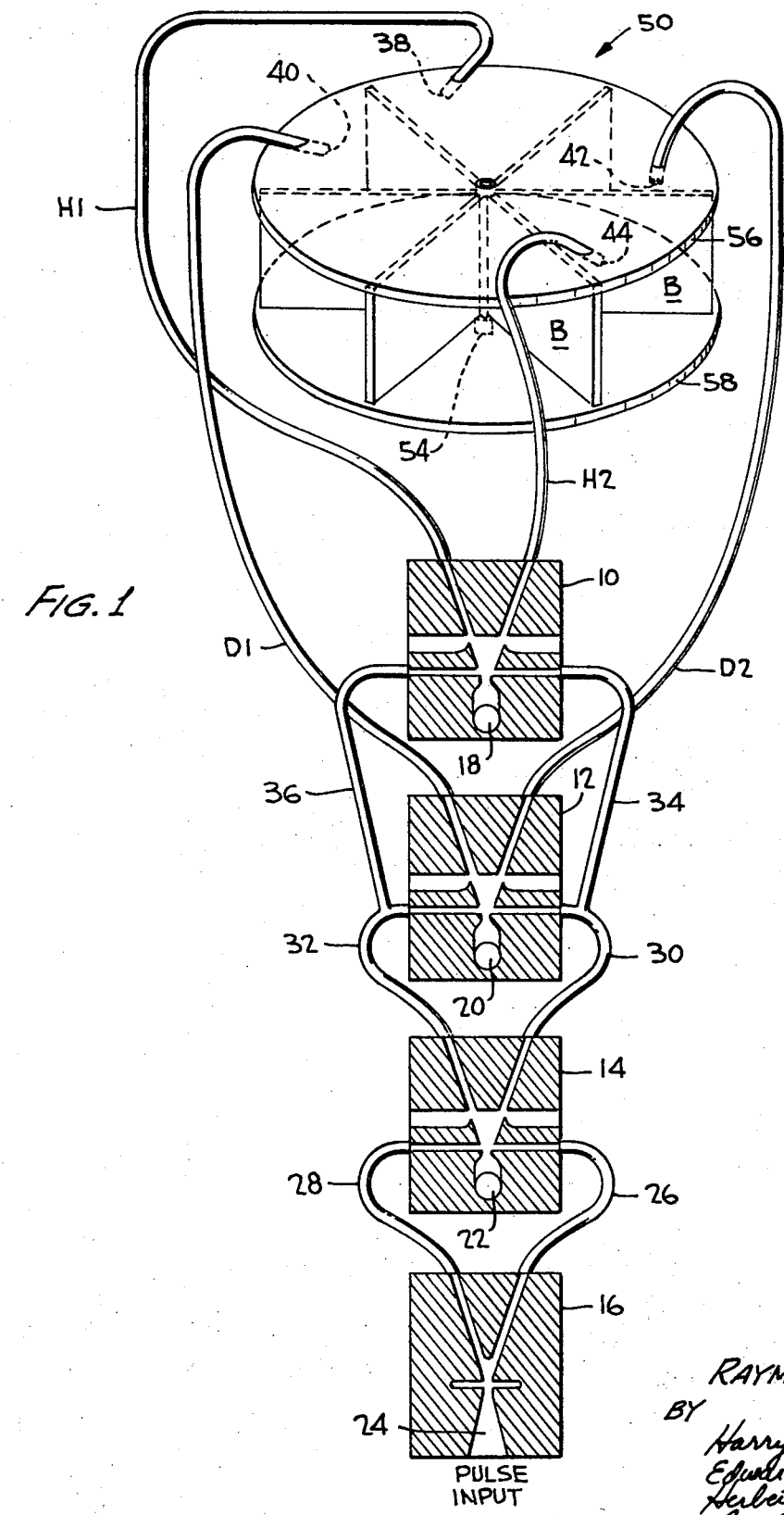
FIG. 1 illustrates a fluid stepping motor in accordance with a preferred embodiment of the present invention.

In FIG. 1 is shown the preferred embodiment of the fluid stepping motor of my invention basically comprising three bistable fluid amplifiers 10, 12 and 14, a fluid pulse converter 16, and a rotary mechanical output device represented at 50. Pulse converter 16 includes an input channel 24 adapted to receive an input pulse either from a preceding logic device or another input source. Input channel 24 divides to form left and right output channels which communicate with left and right control channels of bistable amplifier 14 via conduits 28 and 26 respectively. Pulse converter 16 converts sequential fluid pulses at its input channel 24 into fluid pulses that alternately issue from its left and right output channels into conduits 28 and 26, respectively, without the need for any moving parts or additional control apparatus. The operation of fluid pulse converter 16 is more fully explained in my U. S. Pat. No. 3,001,698.

Bistable amplifiers 10, 12 and 14 are of the well known boundary layer controlled type wherein a fluid power stream is obtained from power inputs 18, 20 and 22, respectively, and is directed in the well known manner to an interaction chamber where a control input from either the left or right control channel will impinge upon the power stream and deflect it to either the left or right output channel as is well taught in the prior art. It is seen in FIG. 1 that the left output channel of amplifier 14 is connected to the left control channel of amplifier 12 via conduit 32 and to the left control channel of amplifier 10 via conduit 36, such that if a pulse input enters pulse converter 16 and exits from its right output channel into conduit 26 thereby causing the power stream issuing from power input 22 to exit along the left output channel of amplifier 14, the resultant flow in conduits 32 and 36 will enter the left control channels of amplifiers 12 and 10 respectively and cause the fluid power streams issuing from power inputs 20 and 18 to exit along the right output channels of amplifiers 12 and 10 respectively. It is similarly seen from FIG. 1 that the right output channel of amplifier 14 is connected to the right control channels of amplifiers 12 and 10 via conduits 30 and 34 respectively. Thus, a pulse input to pulse converter 16 that exits along its left output channel into conduit 28 will cause the fluid power stream issuing from power input 22 to exit along the right output channel of amplifier 14, which in turn creates a fluid flow in conduits 30 and 34 that feed to the right control channels of amplifiers 12 and 10 respectively to cause the power stream issuing from power inputs 20 and 18 to exit from the left output channels of amplifiers 12 and 10 respectively.

The left and right output channels of amplifier 12 are connected to drive conduits D1 and D2, respectively, and the left and right output channels of amplifier 10 are connected to hold conduits H1 and H2, respectively. The output orifices 40, 42, 38 and 44 of drive channels D1 and D2 and hold channels H1 and H2, respectively, are positioned among a rotary mechanical device 50 in a manner that will be more fully explained hereinafter. Rotary mechanical device or rotor 50 typically comprises a plurality of blades B radially connected to a pivotable shaft 54 that is held in place by a top plate 56 and a base plate 58. Blades B are free to rotate within the confines of plates 56 and 58 and are connected to shaft 54 such that any motion imparted to blades B will be transmitted to shaft 54. Shaft 54 can extend beyond either or both of plates 56 and 58 so that its movements may be monitored by an indicator device or coupled to a suitable output mechanical device.

It should be understood from the foregoing description that when a pulse input enters pulse converter 16 and exits along its left output channel into conduit 28, the fluid power streams issuing from power inputs 20 and 18 of amplifiers 12 and 10 respectively will proceed through their left output channels through drive conduits D1 and hold conduits H1 to issue simultaneously from orifices 40 and 38 respectively, to act upon rotor 50. The next succeeding pulse entering pulse converter 16 will exit along its right output channel through conduit 26 and thereby cause the fluid power stream issuing from power inputs 20 and 18 of amplifiers 12 and 10 respectively to switch from their left output channels to their right output channels and thus be received by drive channel D2 and hold channel H2, respectively, to cause fluid impulses to issue simultaneously from orifices 42 and 44, respectively. It is seen therefore that each successive pulse that is applied to pulse converter 16 will cause the fluid power streams issuing from amplifiers 12 and 10 to switch from one pair of drive and hold channels to the other. The relative placement of the orifices 40, 42, 38 and 44 in plate 56 of rotor 50 is rather important in order for the device to work properly, and will be explained with the aid of FIG. 2 and FIG. 3.

Figure 2:
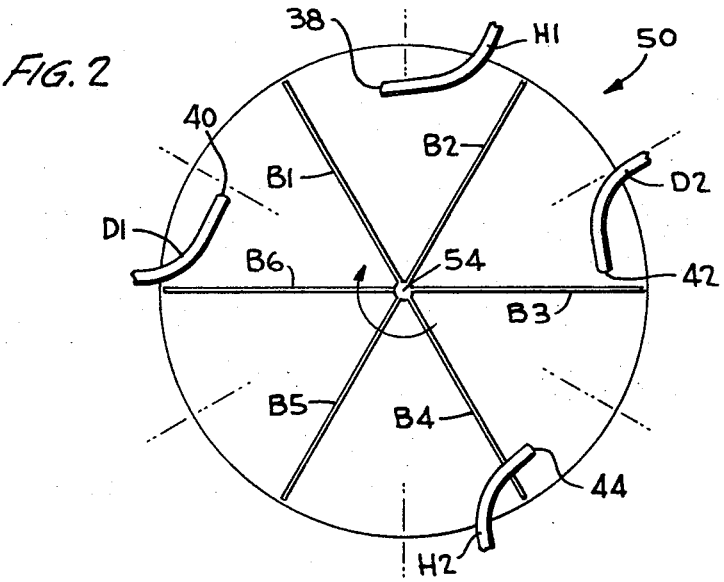
FIG. 2 illustrates a particular sequence in the operation of the fluid stepping motor of FIG. 1.
Figure 3:
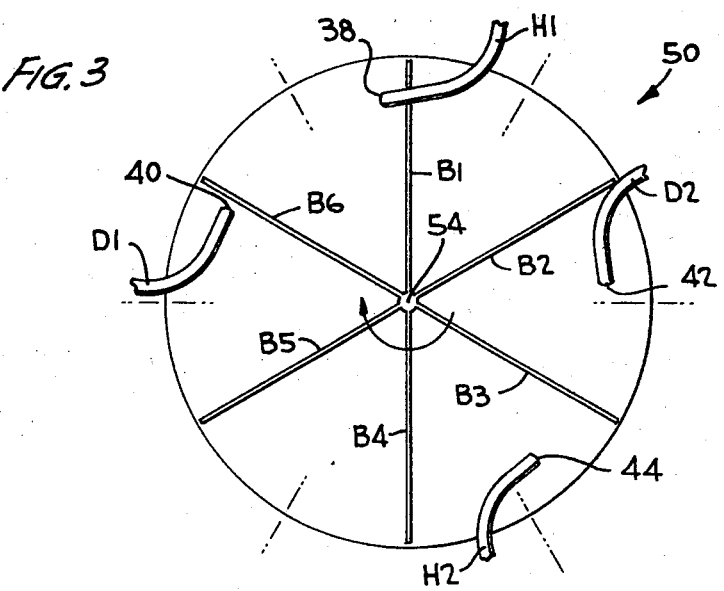
FIG. 3 illustrates another sequence in the operation of the fluid stepping motor of FIG. 1.

FIG. 2 shows a top view of the rotor 50 of FIG. 1 wherein we have selected by way of illustration six blades B1, B2, B3, B4, B5 and B6 to be radially disposed about pivotable shaft 54. Orifices 40, 42, 38 and 44 of drive channels D1 and D2 and hold channels H1 and H2, respectively, are shown positioned with respect to the blades of rotor 50 so as to allow the device to work properly as a stepping motor. The angles with which the orifices make with vertical portions of the blades, not shown in this view, can be selected for convenience, and are of very little importance to the proper operation of the device, so long as those angles remain constant once chosen. The operational segment of the stepping motor as represented by FIG. 2 assumes that drive channel D1 and hold channel H1 are in an "ON" state, whereby fluid is simultaneously issuing from orifices 40 and 38 and impinging upon opposite sides of blade B1 such that blade B1 is in a state of static equilibrium with respect to the pressure of the fluid streams issuing from orifices 40 and 38. During the phase shown in FIG. 2, drive channel D2 and hold channel H2 are in an "OFF" state, just prior to the application of the next pulse to the system. It is seen from FIG. 2 that drive channel D2 is positioned such that the static equilibrium condition established by drive channel D1 and hold channel H1 will bring blade B3 just forward of orifice 42 of drive channel D2 in preparation for the receipt of the next step command from the system. Upon the application of the next pulse input to the system, fluid flows will switch from drive channel D1 and hold channel H1 to drive channel D2 and hold channel H2 in the manner already described. The immediate effect of this switch will cause fluid issuing from drive channel D2 through orifice 42 to impinge directly upon blade B3. Blade B3 will then rotate clockwise about shaft 54 to a position corresponding to the equilization of fluid pressure upon both sides of blade B3 as established by the fluid issuing simultaneously from orifice 44 and orifice 42. This position will correspond to another state of static equilibrium as depicted in FIG. 3. It is seen from FIG. 3 that this position of static equilibrium will place blade B6 just forward of drive channel D1 in preparation for the next succeeding step command. Thus, upon the application of the next succeeding pulse input to pulse converter 16, amplifiers 12 and 10 will switch, causing fluid to cease issuing from drive channel D2 and hold channel H2 and to begin issuing from drive channel D1 and hold channel H1. The fluid impulse now issuing from orifice 40 of drive channel D1 will impinge directly upon blade B6 of rotor 50 to advance shaft 54 another step in a clockwise direction as aforedescribed. It is seen that this cyclical operation will repeat itself at a rate determined by the input pulse frequency to pulse converter 16, thus providing a rotary mechanical stepping output at shaft 54 corresponding to a fluid pulse input at pulse converter 16 in accordance with the present invention.

It is thus seen that I have provided a unique fluid stepping motor that is rugged, reliable, has no moving parts other than the output rotor, is simple to construct and is of low cost. The rate of response is limited only by the mechanical considerations in the rotor device. The fluid stepping motor of the present invention will find wide use in fluid and digital logic control systems.

I wish it to be understood that I do not desire to be limited to the exact details of construction shown and described, for obvious modifications will occur to a person skilled in the art.

I claim as my invention:

1. A fluid stepping motor, comprising:
   a. first and second fluid amplifiers each having a fluid power source for establishing a continuous power stream, first and second control channels, and first and second output channels, wherein the pair of first output channels comprises a first output drive channel and first output hold channel connected to said first fluid amplifier and said second fluid amplifier, respectively, and wherein the pair of second output channels comprises a second output drive channel and a second output hold channel connected to said first fluid amplifier and said second fluid amplifier, respectively;
   b. means connected to said first and second fluid amplifiers for controlling the issuance of fluid from the pair of said first and second output channels; and
   c. a rotor having a plurality of blades radially connected to a pivotable shaft, said fluid streams issuing from the pair of said first and second output channels directed toward said blades in such a manner so as to impart a stepping motion thereto upon command from said control means, whereby any motion imparted to said blades is transmitted to said shaft to provide an output indication.

2. The invention according to claim 1 wherein said control means causes fluid to issue alternately from the pair of said first output channels and from the pair of said second output channels whereby said first output drive channel acts in conjunction with said first output hold channel, as do said second output drive channel with said second output hold channel.

3. The invention according to claim 2 wherein the fluid issuing from said first output drive channel impinges upon one of said plurality of blades of said rotor so as to advance said rotor one step whereupon the fluid simultaneously issuing from said first output hold channel impinges upon said blade so as to bring said blade to a position of static equilibrium with respect to the fluids issuing from the pair of said first output channels.

4. The invention according to claim 3 whereupon after an advance of said rotor caused by fluid issuing from the pair of said first output channels, the pair of said second output channels will be positioned such that upon command from said control means, the fluid issuing from said second pair causes said rotor to advance one step in a manner similar to that caused by the pair of said first output channels.

5. The invention according to claim 4 wherein said control means comprises:
   a. a third fluid amplifier having a fluid power source for establishing a continuous power stream, a first output channel connected to both of said first control channels of said first and second fluid amplifiers, a second output channel connected to both of said second control channels of said first and second fluid amplifiers, and a pair of control channels; and
   b. means in communication with said pair of control channels of said third fluid amplifier for causing said continuous power stream of said third fluid amplifier to switch from one of its said output channels to another whereby the fluid streams issuing from said output channels of said first and second fluid amplifiers are subsequently caused to switch from one of their respective output channels to another.

6. The invention according to claim 5 wherein said means in communication with said pair of control channels of said third fluid amplifier comprises a fluid pulse converter.

7. The invention according to claim 6 wherein said rotor advances one step upon the application of each input fluid pulse to said pulse converter.

* * * * *